(12) United States Patent
Basile

(10) Patent No.: US 10,771,527 B2
(45) Date of Patent: Sep. 8, 2020

(54) CACHING AND STREAMING OF DIGITAL MEDIA CONTENT SUBSETS

(71) Applicant: Fastly Inc., San Francisco, CA (US)

(72) Inventor: Stephen Basile, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 0 days.

(21) Appl. No.: 16/222,069

(22) Filed: Dec. 17, 2018

(65) Prior Publication Data
US 2019/0199766 A1 Jun. 27, 2019

Related U.S. Application Data

(63) Continuation of application No. 14/263,494, filed on Apr. 28, 2014, now Pat. No. 10,165,029.

(60) Provisional application No. 61/934,053, filed on Jan. 31, 2014.

(51) Int. Cl.
| | |
|---|---|
| *G06F 15/16* | (2006.01) |
| *H04L 29/06* | (2006.01) |
| *H04L 29/08* | (2006.01) |
| *H04N 21/231* | (2011.01) |
| *H04N 21/2343* | (2011.01) |
| *H04W 4/18* | (2009.01) |

(52) U.S. Cl.
CPC .......... *H04L 65/60* (2013.01); *H04L 65/4084* (2013.01); *H04L 65/605* (2013.01); *H04L 67/2842* (2013.01); *H04N 21/2343* (2013.01); *H04N 21/23106* (2013.01); *H04W 4/18* (2013.01)

(58) Field of Classification Search
CPC . H04L 65/60; H04L 65/601; H04N 21/23106; H04N 21/2343; H04W 4/18
See application file for complete search history.

(56) References Cited

U.S. PATENT DOCUMENTS

| | | | |
|---|---|---|---|
| 8,417,828 B2 | 4/2013 | Ma et al. | |
| 8,849,950 B2 * | 9/2014 | Stockhammer | ....... H04L 65/105 709/217 |
| 9,038,116 B1 | 5/2015 | Knox et al. | |
| 10,165,029 B2 * | 12/2018 | Basile | ..................... H04L 65/60 |
| 2010/0318632 A1 | 12/2010 | Yoo et al. | |

(Continued)

OTHER PUBLICATIONS

Liu, Jiangchuan et al. "Proxy Caching for Media Streaming Over the Internet". IEEE Communications Magazine, IEEE Service Center. vol. 42, No. 8, pp. 88-94. Aug. 1, 2004.

*Primary Examiner* — Umar Cheema
*Assistant Examiner* — Tesfu N Mekonen

(57) ABSTRACT

Systems, methods, apparatuses, and software for provide a digital media caching environment are provided herein. In one example, a method of operating a content node to provide a digital media caching environment is provided. The method includes receiving a request transferred by an end user device for digital media content. Responsive to the request, the method includes retrieving at least a header portion and a content subset of the digital media content from an origin server and transmuxing the content subset of the digital media content from an origin format into a stream format suitable for streaming to the end user device, and streaming the content subset in the stream format for delivery to the end user device.

17 Claims, 7 Drawing Sheets

(56) References Cited

U.S. PATENT DOCUMENTS

| | | | |
|---|---|---|---|
| 2011/0055386 A1* | 3/2011 | Middleton | H04L 67/125 709/224 |
| 2011/0080940 A1* | 4/2011 | Bocharov | H04N 21/4331 375/240.01 |
| 2011/0296048 A1* | 12/2011 | Knox | H04L 65/605 709/231 |
| 2012/0215779 A1* | 8/2012 | Lipstone | H04L 65/4084 707/737 |
| 2013/0185387 A1* | 7/2013 | Gero | H04L 67/1095 709/217 |
| 2013/0275557 A1* | 10/2013 | Myers | H04N 21/2221 709/219 |
| 2013/0290465 A1* | 10/2013 | Harrison | H04L 67/04 709/213 |
| 2014/0173067 A1 | 6/2014 | Newton et al. | |
| 2014/0189761 A1* | 7/2014 | Sood | H04N 21/26283 725/92 |
| 2014/0223002 A1 | 8/2014 | Varney et al. | |
| 2014/0229570 A1* | 8/2014 | Westberg | H04L 65/605 709/217 |
| 2014/0281035 A1 | 9/2014 | Harrison et al. | |
| 2015/0089075 A1* | 3/2015 | Strigeus | G06F 16/2228 709/231 |
| 2019/0190971 A1* | 6/2019 | Chen | H04L 65/4076 |

\* cited by examiner

CACHING AND STREAMING OF DIGITAL MEDIA CONTENT SUBSETS

RELATED APPLICATIONS

This application is a Continuation of and hereby claims priority to U.S. patent application Ser. No. 14/263,494, entitled titled "CACHING AND STREAMING OF DIGITAL MEDIA CONTENT SUBJECTS," filed Apr. 28, 2014, which claims priority to U.S. Provisional Patent Application 61/934,053, titled "ON-DEMAND CACHING AND STREAMING OF DIGITAL MEDIA," filed Jan. 31, 2014, and which is hereby incorporated by reference in its entirety.

TECHNICAL FIELD

Aspects of the disclosure are related to the field of communication networks and delivery of content from content servers to end user devices.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin or hosting servers which originally host network content, such as web servers for hosting a news website. However, these computer systems of individual content origins or hosts can become overloaded and slow due to frequent requests of content by end users.

Content delivery networks have been developed which add a layer of caching between the origin servers of the content providers and the end users. The content delivery networks typically have one or more content nodes distributed across a large geographic region to provide faster and lower latency access to the content for the end users. When end users request content, such as a web page, which is handled through a content node, the content node is configured to respond to the end user requests instead of the origin servers. In this manner, a content node can act as a proxy or cache for the origin servers. Content of the origin servers can be cached into the content nodes, and can be requested via the content nodes from origin servers when the content has not yet been cached.

OVERVIEW

Systems, methods, apparatuses, and software for provide a digital media caching environment are provided herein. In one example, a method of operating a content node to provide a digital media caching environment is provided. The method includes receiving a request transferred by an end user device for digital media content. Responsive to the request, the method includes retrieving at least a header portion and a content subset of the digital media content from an origin server and transmuxing the content subset of the digital media content from an origin format into a stream format suitable for streaming to the end user device, and streaming the content subset in the stream format for delivery to the end user device.

In another example, a content node to provide a digital media caching environment is provided. The content node includes a communication interface configured to receive a request transferred by an end user device for digital media content. Responsive to the request, the communication interface is configured to retrieve at least a header portion and a content subset of the digital media content from an origin server. The content node includes a processing system configured to transmux the content subset of the digital media content from an origin format into a stream format suitable for streaming to the end user device. The communication interface is configured to stream the content subset in the stream format for delivery to the end user device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

DETAILED DESCRIPTION

Figure 1:
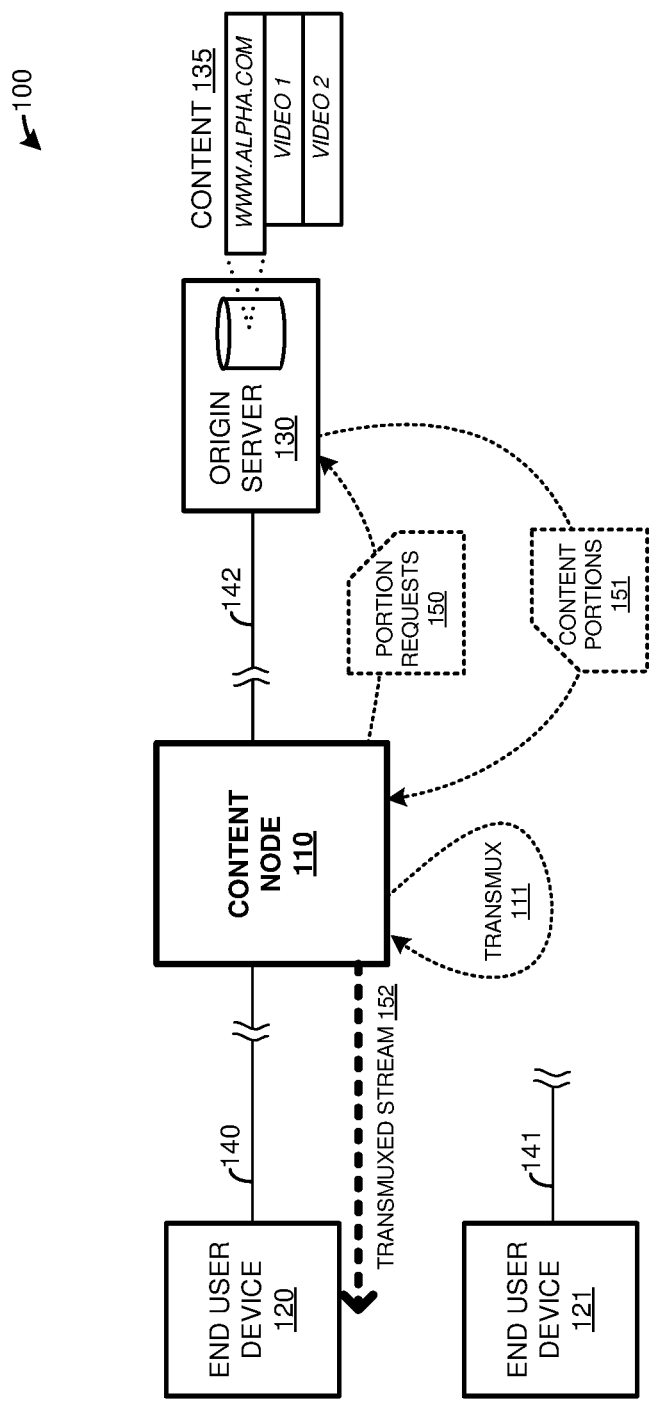
FIG. 1 is a system diagram illustrating a communication system.

Network content, such as web page content, typically includes content such as text, hypertext markup language (HTML) pages, pictures, digital media content, video, audio, code, scripts, or other content viewable by an end user in a browser or other application. In some examples, the network content can be stored and served by origin servers that are owned or operated by content originators. The network content includes example website content referenced in FIG. 1, such as "www.alpha.com," among others, which can also include video content, audio content, or other digital content. In some examples, origin servers can serve the content to end user devices. However, when a content node or cache node is employed, such as in FIG. 1, the content node can act as a proxy to cache content for delivery between origin servers and end user devices. The content nodes herein can also comprise cache nodes.

Content delivery networks can add a layer of caching between origin servers of the content providers and the end users. The content delivery networks typically have one or more content nodes distributed across a large geographic region to provide faster and lower latency local access to the content for the end users. When end users request content, such as a web page, a selected content node will respond to the content request instead of the associated origin server. Various techniques can be employed to ensure the content node responds to content requests instead of the origin servers, such as associating web content of the origin servers with network addresses of the content nodes instead of network addresses of the origin servers using domain name system (DNS) registration and lookup procedures. Although content nodes and origin servers are shown as different nodes in the examples herein, it should be understood that the origin servers and content nodes can be included in one or more of the same nodes.

The content nodes can maintain recently accessed and popular content as cached from the content sources. Thus, content nodes exchange data with the content sources when new or un-cached information is requested by the end users or if something has changed in the content source data. Some content can include large source files, such as digital media including movies, live broadcasts, audio files, or user-generated videos. In some example content nodes, these large source files are cached. However, end users can typically request different formats or containers for the digital media, leading to caching of many different copies of large files in the content node. Content delivery networks can struggle with large digital media files, such as movies, live broadcasts, large audio files, or user-generated videos, since caching of the large media files can lead to poor performance or unreasonable storage requirements due to the process of caching entire large media file from an origin server to a content node. Also, the digital format or digital container of these media files can be unsuitable for streaming to an end user.

Transcoding and transmuxing of the media files prior to any initial end user requests for the media can also be time consuming and require further data storage to store multiple versions of each media file. Transcoding typically involves changing properties of the media content, such as a bit rate, encoding scheme, frame rate, resolution, compression, or other properties. Transmuxing, in contrast, changes a container or wrapper associated with the media content, such as changing from one media container format suitable for viewing a medial file on a local machine, to a different media container format suitable for streaming over a network or the Internet.

As a first example employing a content delivery network, FIG. 1 is presented. FIG. 1 is a system diagram illustrating communication system 100. Communication system 100 includes content node (CN) 110, end user devices 120-121, and origin server 130. Content node 110 can be included in a content delivery network, not shown in FIG. 1 for clarity. Content node 110 can include one or more data storage systems. End user devices 120-121 are representative of a plurality of end user devices which can request and receive network content, and any number of end user devices 120-121 can be associated with content node 110. Content node 110 and end user device 120 communicate over at least network link 140. Content node 110 and end user device 121 communicate over at least network link 141. Content node 110 and origin server 130 communicate over at least network link 142.

To further illustrate FIG. 1, a brief description of the operation of communication system 100 is included. In operation, end user device 120-121 request network content, such as content 135 associated with origin server 130. Instead of these requests being handled by the origin server 140, content node 110 of a content delivery network receives the content requests over ones of links 140-141 and processes the content requests for delivery of the content to the associated end user devices 120-121. Requested network content that is already stored in content node 110 can be provided quickly to the end user devices, while network content that is not already stored in content node 110 can be responsively requested by an associated content node 110 from origin server 130 for caching by content node 110. In this manner, content node 110 can act as an intermediary proxy node to provide local and fast access for end user devices 120-121 to network content of origin server 130 without burdening origin server 130 with many end user content requests.

Content node 110 and origin server 130 can each include communication interfaces, network interfaces, processing systems, computer systems, microprocessors, storage systems, storage media, or some other processing devices or software systems, and can be distributed among multiple devices. Examples of content node 110 and origin server 130 can each include software such as an operating system, logs, databases, utilities, drivers, networking software, and other software stored on a computer-readable medium.

End user devices 120-121 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 140-142 each use metal, glass, optical, air, space, or some other material as the transport media. Communication links 140-142 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 140-142 can each be a direct link or can include intermediate networks, systems, or devices, and can include a logical network link transported over multiple physical links. Although one main link for each of links 140-142 is shown in FIG. 1, it should be understood that links 140-142 are merely illustrative to show communication modes or access pathways. In other examples, further links can be shown, with portions of the further links shared and used for different communication sessions or different content types, among other configurations. Communication links 140-142 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 2:
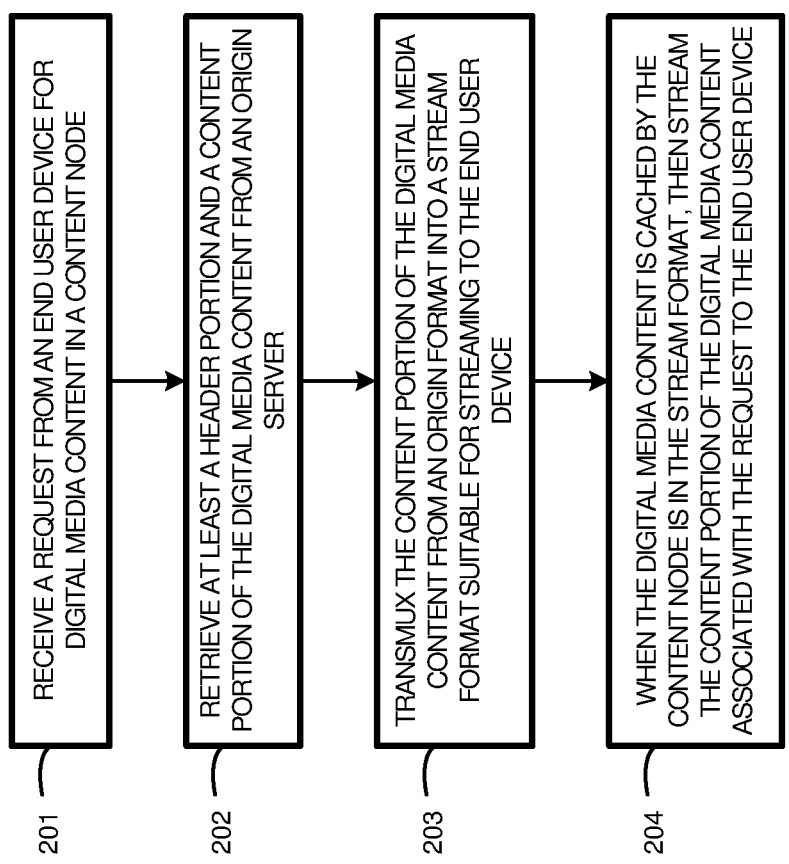
FIG. 2 is a diagram illustrating a method of operation of a content node.

As a further example of the operations of communication system 100 and content node 110, FIG. 2 is presented. FIG. 2 illustrates a flow diagram which describes an example method of operation of a content node, such as content node 110 of FIG. 1. The operations of FIG. 2 are referenced parenthetically in the description below.

In FIG. 2, content node 110 receives (201) a request from an end user device for digital media content. In this example, the end user request originates from end user device 120 and is received by content node 110. However, any of end user devices 120-121 can instead be involved in the request of digital media content. The end user request can include a request for digital media content associated with a web page or other content site. For example, the end user request can be a user clicking on a hyperlink in a web page, such as selecting "video 1" to watch while browsing a web page associated with www.alpha.com. Other requests can be received, such as through network protocols including FTP, HTTP, HTTPS, and the like.

Responsive to the request from the end user device, content node 110 can determine if the digital media content is already cached by content node 110. Specifically, when the digital media content is not cached by a content node serving the request, the content node can retrieve (202) at least a header portion and a content portion of the digital media content from an origin server and optionally transmux (203) the content portion of the digital media content from an origin format into a stream format suitable for streaming to the end user.

In one example, the end user requests "video 1" associated with www.alpha.com, and "video 1" is not presently cached by content node 110. Responsive to the request of end user device 120, content node 110 retrieves a header portion and a content portion of the digital media content from origin server 130. This request or requests for a header portion and a content portion can be seen in FIG. 1 as "portion request 150." A header associated with "video 1" along with a portion of the media content of "video 1" is retrieved from origin server 130. The header portion can include metadata that describes "video 1" or includes properties for "video 1," such as length, encoding format, frame rate, bit rate, resolution, compression format, and the like. The media content portion includes a subset of the entire digital media content, such as a certain timewise portion of "video 1" as indicated by a start time and end time, or a content subset of a data file associated with "video 1." The content portion, in this example, comprises a subset of the entire content associated with the digital media content. For example, if "video 1" is a media file, then the content subset comprises a subset of the entire content included in the media file.

To request the header portion or the media content portion, content node 110 can issue one or more HTTP range requests to origin server 130. The HTTP range requests can indicate a first range to retrieve the header portion of "video 1" and can indicate a second range to retrieve the portion of the media content. In many examples, separate HTTP range requests are issued, one for the header portion, and one for the portion of the media content. The HTTP range request can be a HTTP "get" request that indicates a byte range for the target data, such as "Range: bytes=9033-9726" to indicate certain bytes of the file associated with the digital media content.

Origin server 130 can responsively transfer the requested portions, namely the header portion and the portion of the media content, such as indicated in "content portions" operation 151 in FIG. 1. Once the header portion has been retrieved by content node 110 from origin server 130, then content node 110 can process the header portion to identify properties of a digital file associated with "video 1." The header portion can be used to identify a byte range for a subsequent HTTP range request to retrieve the content portion of the digital file. For example, when the header portion indicates a video duration or playback length, the duration or length can be processed to identify a byte range for the digital file that corresponds to the desired content portion, such as a desired time range of "video 1."

In addition to retrieving a portion of the content for delivery to an end user device, the header portion can also be used to identify a source or origin format of the video content, such as compression scheme, compression type, packaging type, container type, among other information. Content node 110 can transcode or transmux the content portion retrieved from origin server 130 into another format. For example, when the origin format is a Motion Pictures Experts Group 4 (MP4) video format, content node 110 can repackage the portion of the content from the MP4 format to another format, such as a streaming format. The origin formats can include a digital storage or container format for digital media content, such as MP4 mentioned above, or can instead include M4V, Motion Pictures Experts Group 2 (MPEG-2), or MPEG-1 digital video formats, among other container or package formats. The streaming formats can include at least one of a hypertext transfer protocol (HTTP) live streaming (HLS) format, HTTP dynamic streaming (HDS) format, HTTP smooth streaming (HSS) format, and Motion Pictures Experts Group (MPEG) dynamic adaptive streaming over HTTP (MPEG-DASH) format.

The transmuxing occurs on the fly once the content portion is received by content node 110, and only occurs for a subset of the entire "video 1" that corresponds to the end user request. This is in contrast to transmuxing ahead of time and irrespective of any end user request, and pre-storing the entire transmuxed video file in origin server 130 or in content node 110. Similar operations can occur for transcoding portions of the video file on-demand, such as changing a compression type, resolution, or bit rate of the content. The transmuxing operation can be seen in FIG. 1 as "transmux 111."

When the digital media content is cached by the content node in the stream format, then content node 110 streams (204) the content portion of the digital media content associated with the request to the end user. For example, once the retrieval and transmuxing operation is complete for the portion of the content associated with "video 1," then content node 110 can stream that content portion in the streaming format for delivery to end user device 120, such as shown in "transmuxed stream 152" in FIG. 1.

In some examples, more than one end user request can be received for the same content or for the same portion of the content. For example, many end user devices might request the same "video 1" associated with www.alpha.com. If the portions of the content overlap, such as the end user requests being for similar time-wise portions of the content, then instead of re-retrieving the content portion from origin server 130, then content node 110 can merely transfer the already-cached portion of the content to respond to the other end user requests. In addition, the header portion associated with the content can be cached by content node 110 until no further end user requests for the content are received, until a predetermined timer expires, or until space is needed in content node 110 to service other end user requests, among other considerations.

Figure 3:
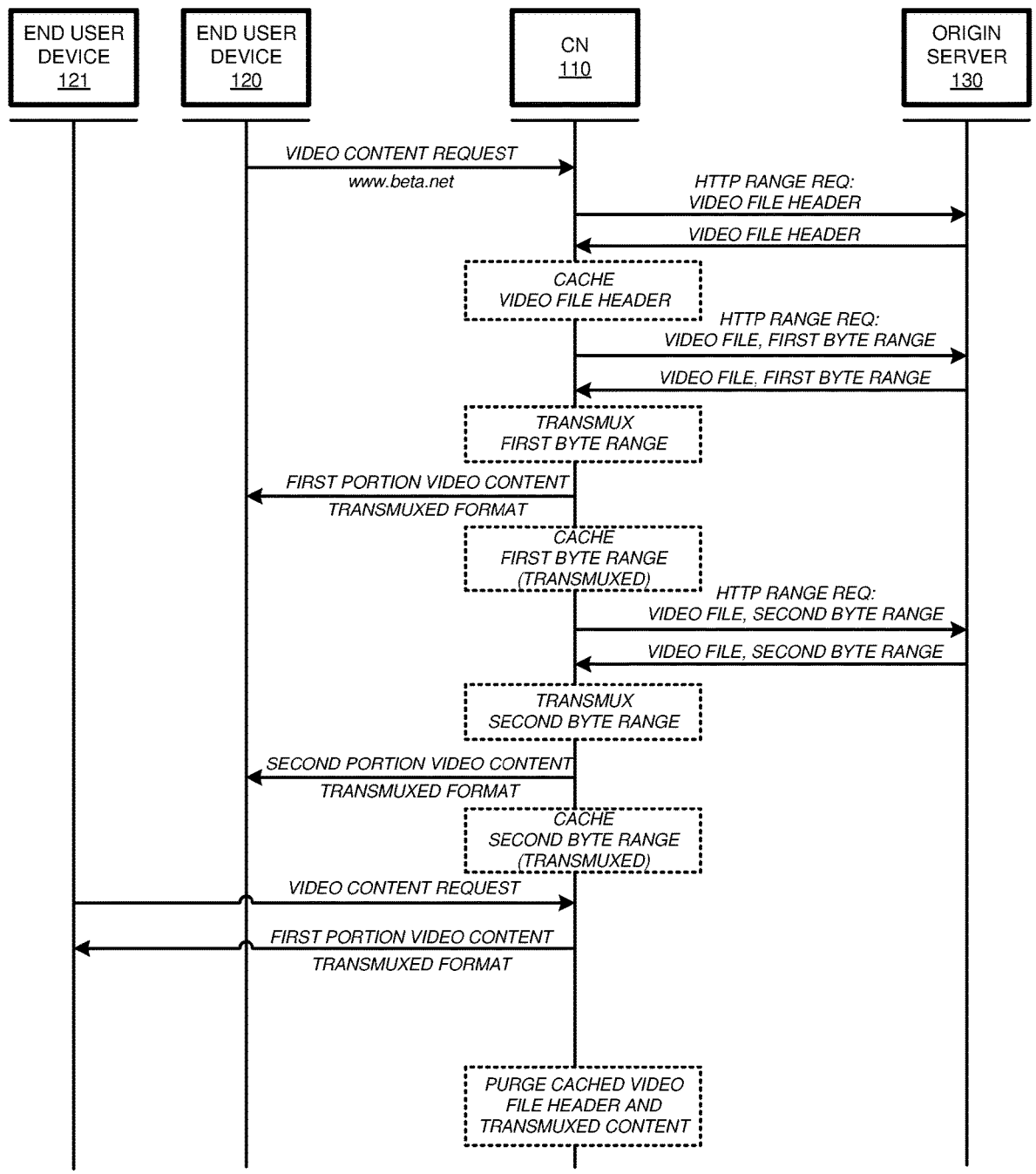
FIG. 3 is a diagram illustrating a method of operation of a content node.

As a further example of the operation of FIG. 1, FIG. 3 is provided. FIG. 3 illustrates a sequence diagram which describes an example method of operation of content node 110 of FIG. 1. In FIG. 3, end user device 120 makes a request for video content, such as through clicking a hyperlink for a video while browsing a website associated with www.alpha.com. This request is transferred to content node 110 for handling of content associated with www.alpha.com. In this example, video content is not initially cached by content node 110 for www.alpha.com. Responsive to the request for video content, content node 110 identifies origin server 130 as a persistent storage location for video content of www.alpha.com. Content node 110 issues an HTTP range request to origin server 130 for a header for a video file associated with the video content, and origin server 130 responsively provides the video file header to content node 110. Content node 110 can cache the video file header for subsequent use in identifying byte ranges or other information about the video file.

Content node 110 processes the video file header to determine a first byte range of the video file located on origin server 130. Once the first byte range is determined, then content node 110 issues an HTTP range request for the particular bytes of the first byte range of the video file. Responsively, origin server 130 returns the requested bytes of the video file.

The first byte range can correspond to a portion of the video content that is sufficient to respond to the end user request for video content. For example, if the end user requests playback of a video of www.alpha.com, starting at the beginning of the video, then content node 110 can process the video file header to determine a first byte range of the video file that corresponds to a beginning portion of the video. If a different playback starting point is desired or selected by end user device 120, then a different corresponding byte range can be identified. The size of the byte range can vary based on performance of content node 110, network throughput speeds of the network links between content node 110 and end user device 120 or origin server 130, among other considerations.

If the video file is presently in a proper format for transfer to end user device 120, then content node 110 can transfer the first byte range for delivery to end user device 120. However, in many examples, the first byte range does not correspond to a proper format for transfer to end user device 120, and a transmuxing process is first performed. Content node 110 can transmux the first byte range of the video file into a streaming format, such as a streaming container, for transfer to end user device 120. In one example, the streaming format includes the HLS streaming format. Once the first byte range has been transmuxed, then content node 110 can transfer the first byte range in the transmuxed format for delivery to end user device 120. Content node 110 can cache the transmuxed first byte range for subsequent delivery to other end user requests for a similar portion of the video content.

If the end user device reaches the end of the first byte range, such as due to playback of the video content, or due to the end user selecting a different playback point, then further bytes can be delivered to end user device 120. In some examples, a separate request for further video content is issued by end user device 120. Content node 110 can issue a second HTTP range request to origin server 130 for a second byte range. The second byte range can be sequential to the first byte range or can be for a different byte range. The second byte range can be identified by processing the cached video file header.

When content node 110 receives the second byte range from origin server 130, content node 110 can transmux the second byte range of the video file into the streaming format. Once the second byte range has been transmuxed, then content node 110 can transfer the second byte range in the transmuxed format for delivery to end user device 120. Content node 110 can cache the transmuxed second byte range for subsequent delivery to other end user requests for a similar portion of the video content.

As a further example, end user device 121 requests video content that corresponds to a playback point included in the first byte range. Since the transmuxed first byte range has already been cached by content node 110, the first byte range can be quickly delivered to end user device 121 without retrieval from origin server 130 and transmuxing. Similar actions can occur if other end users request similarly cached video content or if end user device 121 requests video content included in the second byte range. Also, if further streaming formats are desired, then further associated transmuxing of the cached byte ranges can occur. After a predetermined period of time, such as when no further end user requests are received for a particular video content, then the file header and transmuxed byte ranges can be purged from storage systems of content node 110.

Figure 4:
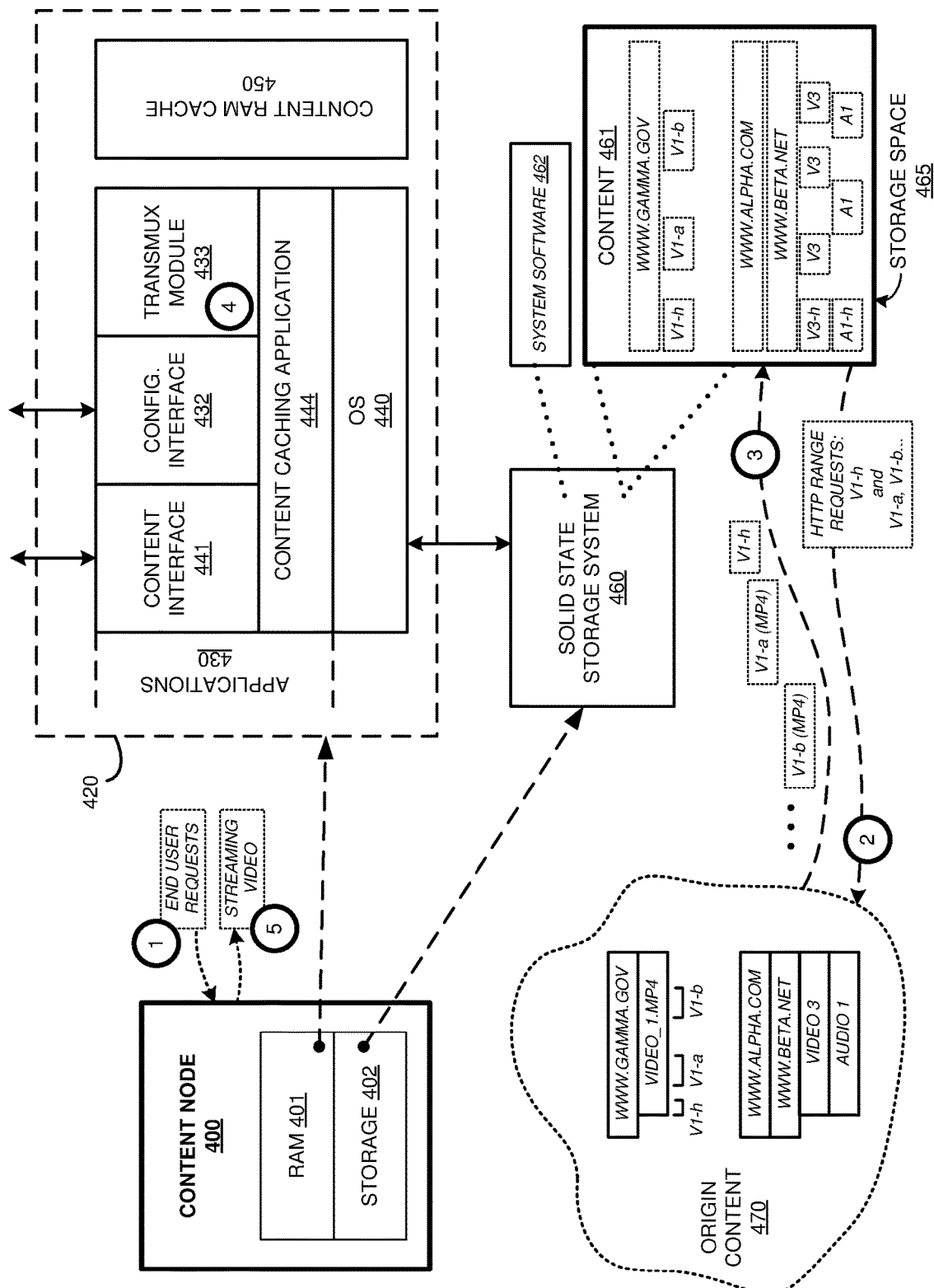
FIG. 4 is a block diagram illustrating a content node.

To further describe the equipment and operation a content node, FIG. 4 is provided which illustrates content node (CN) 400. CN 400 can be an example of content node 110, although variations are possible. CN 400 includes random access memory (RAM) 401 and storage 402, although further elements can be included, such as discussed in FIG. 6. Example contents of RAM 401 are further detailed in RAM space 420, and example contents of storage 402 are further detailed in solid state storage system 460.

RAM 401 and storage 402 together can comprise a non-transitory data storage system, although variations are possible. RAM 401 and storage 402 can each comprise any storage media readable by a processing system and capable of storing software. RAM 401 can include volatile and nonvolatile, removable and non-removable media implemented in any method or technology for storage of information, such as computer readable instructions, data structures, program modules, or other data. Storage 402 can include non-volatile storage media, such as solid state storage media, flash memory, or as illustrated by solid state storage system 460 in this example. RAM 401 and storage 402 can each be implemented as a single storage device but can also be implemented across multiple storage devices or sub-systems. RAM 401 and storage 402 can each comprise additional elements, such as controllers, capable of communicating with a processing system.

Software stored on or in RAM 401 or storage 402 can comprise computer program instructions, firmware, or some other form of machine-readable processing instructions having processes that when executed a processing system direct CN 400 to operate as described herein. For example, software drives CN 400 to receive requests for content, determine if the content is stored in CN 400, retrieve content from origin servers, transfer content to end user devices, manage data storage systems for handling and storing the content, among other operations. The software can also include user software applications. The software can be implemented as a single application or as multiple applications. In general, the software can, when loaded into a processing system and executed, transform the processing system from a general-purpose device into a special-purpose device customized as described herein.

RAM space 420 illustrates a detailed view of an example configuration of RAM 401. It should be understood that different configurations are possible. RAM space 420 includes applications 430, operating system (OS) 440, and content RAM cache 450. Content RAM cache 450 includes RAM space for temporary storage of content, such as dynamic random access memory (DRAM).

Applications 430 include content interface 431, configuration interface 432, transmuxing module 433, and content caching application 434. Content caching application 434 handles caching of content and management of storage spaces, such as content RAM cache 450 and storage space 465, as well as exchanges content, data, and instructions via content interface 431, configuration interface 432, and transmuxing module 433. Content caching application 434 can comprise a custom application, Varnish caching software, hypertext transfer protocol (HTTP) accelerator software, or other content caching and storage applications, including variation, modifications, and improvements thereof. Applications 430 and OS 440 can reside in RAM space 420 during execution and operation of CN 400, and can reside in system software storage space 462 on solid state storage system 460 during a powered-off state, among other locations and states. Applications 430 and OS 440 can be loaded into RAM space 420 during a startup or boot procedure as described for computer operating systems and applications.

Content interface 431, configuration interface 432, and transmuxing module 433 each allow a user to interact with and exchange data with content caching application 434. In some examples, each of content interface 431, configuration interface 432, and transmuxing module 433 comprise an application programming interface (API). Content interface 431 allows for exchanging content for caching in CN 400 by content caching application 434, and can also receive instructions to purge or erase data from CN 400. Content interface 431 can retrieve portions of digital media from origin servers for transmuxing by transmux module 433 and for delivery to end users. Configuration interface 432 allows for altering the configuration of various operational features of content caching application 434. In some examples, configuration interface 432 comprises a scripting language interface, such as Varnish Configuration Language (VCL), Perl, PHP, Javascript, or other scripting or interpreted language-based interfaces. Transmuxing module 433 can repackage digital media content, or portions thereof, from one format to another format, such as from an MP4 format to a HLS or HLD format, among others. Content interface 431 and configuration interface 432 each can communicate with external systems via communication interface 310 over any associated network links.

Solid state storage system 460 illustrates a detailed view of an example configuration of storage 402. Solid state storage system 460 can comprise flash memory such as NAND flash or NOR flash memory, among other solid state storage technologies. As shown in FIG. 4, solid state storage system 460 includes system software 362, as well as content 361 stored in storage space 465. As described above, system software 362 can be a non-volatile storage space for applications 430 and OS 440 during a powered-down state of CN 400, among other operating software. Content 361 includes cached content, such as the web content examples in FIG. 1, which can include text, data, pictures, video, audio, web pages, scripting, code, dynamic content, or other network content. Although solid state storage system 460 is employed in FIG. 4, it should be understood that other non-solid state storage systems can be employed, such as hard disk drives, optical storage devices, magnetic storage devices, and the like.

Content origin 470 is not included in CN 400, but is included in FIG. 4 for clarity. Content origin 470 can include one or more origin servers, such as that described for origin server 130 in FIG. 1, to host media content. In this example, content origin 470 stores video and audio files associated with one or more websites, as indicated by www.gamma.gov, www.alpha.com, and www.beta.net. The video files are in the MP4 format in this example.

Content node 400 is generally intended to represent a computing system with which at least software 430 and 440 are deployed and executed in order to render or otherwise implement the operations described herein. However, content node 400 can also represent any computing system on which at least software 430 and 440 can be staged and from where software 430 and 440 can be distributed, transported, downloaded, or otherwise provided to yet another computing system for deployment and execution, or yet additional distribution.

Figure 5:
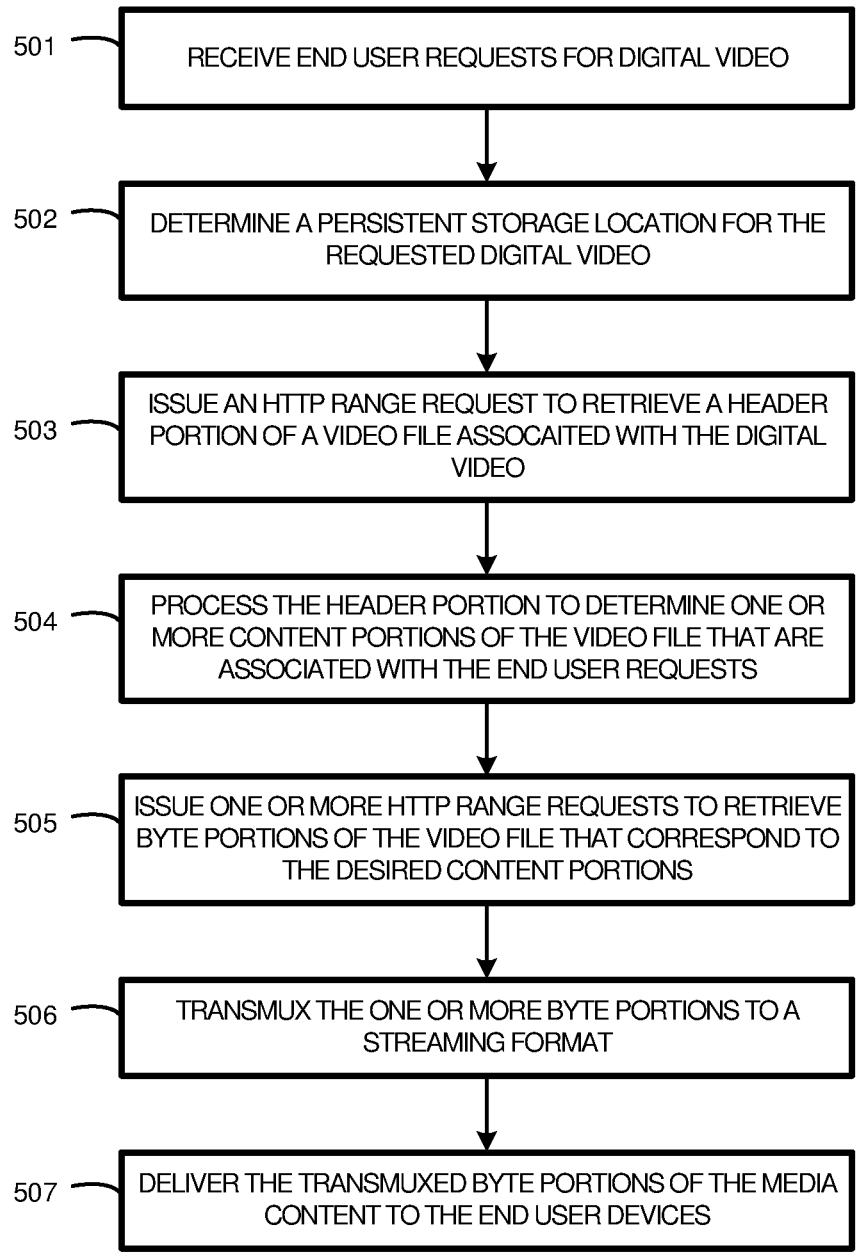
FIG. 5 is a diagram illustrating a method of operation of a content node.

FIG. 5 is a flow diagram illustrating a method of operation of content node (CN) 400 of FIG. 4. The operations described in FIG. 5 can also describe example operations of any of content node 120 of FIG. 1. In FIG. 5, CN 400 receives (501) end user requests for digital video, such as to watch video encountered while browsing www.gamma.gov. Portions of www.gamma.gov, such as web pages, pictures, dynamic content, Javascript, and the like, can be cached by CN 400 and the end user requests can be responsive browsing to this cached content. For example, an end user can view a web page associated with the domain www.gamma.gov (or any other domain handled by CN 400) and select a video or other media file to view. This view selection can include clicking a link, selecting an embedded media player function, or any other method to request a media file for the digital video associated with the website. However, in this example, the media file associated with the digital video is not cached by CN 400, and is instead handled by CN 400 on a per-request basis from origin servers or other data servers which store the media files in a non-cached manner Operation 501 can be seen as step '1' in FIG. 4.

Responsive to the end user requests, CN 400 determines (502) a persistent storage location for the requested digital video, namely one or more servers associated with origin content 470. In this example, the digital video corresponds to media file video_1.mp4 stored in origin content 470. Origin content 470 can be located in one or more origin servers, such as that described for origin server 130 in FIG. 1 or origin servers 740-741 in FIG. 7.

CN 400 then requests (503) a header portion of a video file associated with the digital video, by issuing one or more HTTP range requests to retrieve the header portion. In this example, the file is video_1.mp4. A first portion of video_1.mp4 includes a header portion or metadata portion, represented by "V1-h" in FIG. 4. This header portion can include file size information, file type information, and other metadata, such as resolution, frame rate, bit rate, compression ratio, compression type, or other information associated with media content of video_1.mp4 or with the file structure of video_1.mp4. The request for the header portion can comprise an HTTP range request for a series of bytes of video_1.mp4 that include at least the header portion of video_1.mp4. Inadvertent extra bytes might be requested beyond just the header bytes, but these extra bytes can be disregarded.

The header portion is processed (504) to determine one or more content portions of video_1.mp4 that are associated with the end user requests. For example, the header portion can be processed to identify a correlation between time portions of the content requested by the end user devices and bytes of video_1.mp4. The header portion can indicate a file size and bit rate of video_1.mp4 which, along with other metadata, can be used to determine the correlation between bytes of video_1.mp4 and specific time ranges. A first time range can correspond to a first byte range of video_1.mp4, as indicated by "V1-a" in FIG. 4, and a second time range can correspond to a second byte range of video_1.mp4, as indicated by "V1-b" in FIG. 4. Further time ranges can be determined as well. Once the desired byte ranges of video_1.mp4 are determined, CN 400 issues one or more HTTP range requests (505) to retrieve byte portions of video_1.mp4 that correspond to the desired content portions of video_1.mp4. The header request and content portion request process can be seen in step '2' of FIG. 4, and the responsive delivery of the header portion and subsequent content portions can be seen in step '3' of FIG. 4.

Once the one or more byte portions of the media content of video_1.mp4 are received, then CN 400 can transmux (506) these one or more byte portions to a different format, such as a streaming format. The transmux process can include taking the media content received in a first container format and repackaging the media content into a different container format. The first container format can be the MP4 format of video_1.mp4, while the different container format can be a streaming format. In the transmuxing process, the media content itself is not changed, and instead a repackaging or container modification is performed. In contrast, a transcoding process can change the underlying media content from a first resolution, bit rate, frame rate, compression format, and the like, to a different resolution, bit rate, frame rate, or compression format. In some examples, a transcoding process can occur on each byte range to transcode the underlying video content to a different format. The streaming formats can include at least one of a hypertext transfer protocol (HTTP) live streaming (HLS) format, HTTP dynamic streaming (HDS) format, HTTP smooth streaming (HSS) format, and Motion Pictures Experts Group (MPEG) dynamic adaptive streaming over HTTP (MPEG-DASH) format. Transmux module 433 of FIG. 4 can process the byte portions of the media content of video_1.mp4 to package each byte portion into the streaming format. This can be seen as step '4' in FIG. 4.

Once the transmuxing process has completed, one or more of the transmuxed byte portions of the media content are delivered (507) to the end user devices that originally made the requests for the video in step '1' or operation 501. This can be seen as step '5' in FIG. 4.

Once the individual content portions have been retrieved and transmuxed if desired, the individual content portions can be cached in content RAM cache 450 or solid state storage system 460 of CN 400. These content portions can be used to service further end user requests for similar time portions of the digital video. The header portion can also be cached to aid in further retrieval of other byte portions of video_1.mp4 for subsequent end user requests. Once no further requests are received for portions of video_1.mp4 or after a predetermined time threshold, then the content portions or the header portion of video_1.mp4 can be discarded or purged from CN 400. In this manner, persistent storage for portions of video_1.mp4 is not needed to service end user requests for video_1.mp4.

In some conventional examples of video delivery, a large file, such as video_1.mp4 is pre-processed to establish predetermined pieces of chunks of video_1.mp4. These predetermined pieces are then held in persistent storage, such as in origin content 470. If transmuxing or transcoding is desired, the conventional examples also merely pre-process the predetermined pieces ahead of any end user requests and store these additional processed pieces in persistent storage. Thus, in conventional examples, a large amount of persistent storage is required to not only store the original video_1.mp4 file, but also any permutation of pieces and transmuxed/transcoded pieces. This can lead to wasteful usage of storage space of origin servers, and can lead to large processing times to pre-process video data prior to any end user request for digital video. Examples of conventional pre-processing and pre-storage include fragmented MP4 and MP4 pseudo streaming. In contrast, the examples discussed herein need only have persistent storage for the original video file, and the content nodes can deliver only desired byte portions of the video file along with any transmux/ transcode processes on-the-fly and on-demand responsive to end user requests. Persistent storage is not needed for this on-demand video delivery discussed herein, and once the video is no longer desired or requested, the transmuxed pieces can be purged, leaving only the origin file on the origin server as persistently stored data.

In yet further examples, in addition to retrieving byte portions of a source file from an origin server, further content can be combined with the video data on-demand. For example, animations, text captioning, keying, or overlays can be added to the individual content pieces on-the-fly in CN 400. This can be useful to add live or current content to old or stored video.

CN can stream the byte portions back to an associated origin server for persistent storage of the byte portions along with the original video file. This can save processing time for future end user requests.

Figure 6:
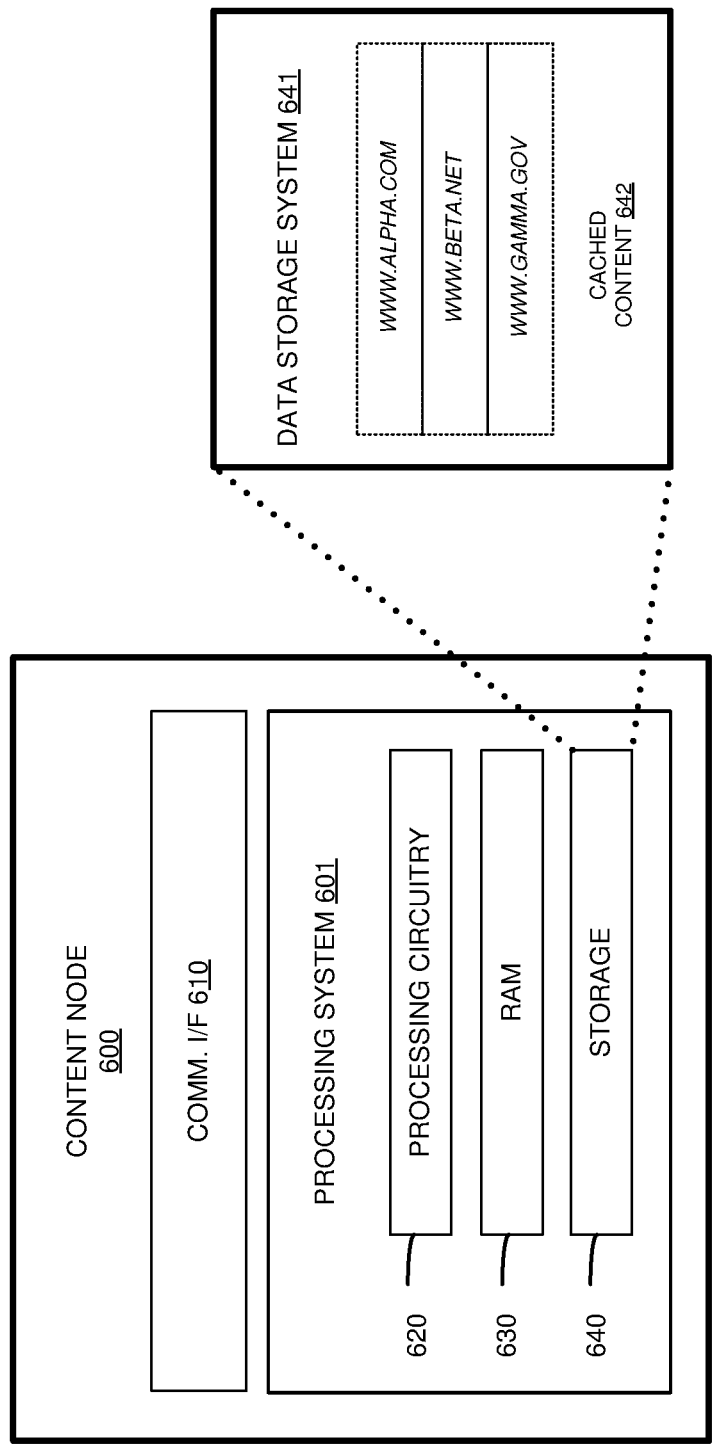
FIG. 6 is a block diagram illustrating a content node.

FIG. 6 illustrates the internal configuration of content node 600. Content node 600 can be an implementation of content node 110 in FIG. 1, content node 400 in FIG. 4, or content nodes 711-713 in FIG. 7, although variations are possible. Content node 600 includes communication interface 610, and processing system 601. Processing system 601 includes processing circuitry 620, RAM 630, and storage 640. In operation, processing system 601 is operatively linked to communication interface 610, RAM 630, and storage 640 by processing circuitry 620. Processing system 601 is capable of executing software stored in RAM 630 or storage 640. When executing the software, processing system 601 drives content node 600 to operate as described herein. Content node 600 can also include other elements, such as user interfaces, computer systems, databases, distributed storage and processing elements, and the like.

Processing system 601 can be implemented within a single processing device but can also be distributed across multiple processing devices or sub-systems that cooperate in executing program instructions. Examples of processing system 601 include general purpose central processing units, microprocessors, application specific processors, and logic devices, as well as any other type of processing device. In some examples, processing system 601 includes physically distributed processing devices, such as cloud computing systems.

Communication interface 610 includes one or more network interfaces for communicating over communication networks, such as packet networks, the Internet, and the like. The network interfaces can include one or more local or wide area network communication interfaces which can communicate over Ethernet or Internet protocol (IP) links. Communication interface 610 can include network interfaces configured to communicate using one or more network addresses, which can be associated with different network links. Examples of communication interface 610 include network interface card equipment, transceivers, modems, and other communication circuitry.

RAM 630 and storage 640 together can comprise a data storage system, such as in data storage system 641 for storage of cached content 642, although variations are possible. RAM 630 and storage 640 can each comprise any non-transitory storage media readable by processing system 601 and capable of storing software. RAM 630 can include volatile and nonvolatile, removable and non-removable media implemented in any method or technology for storage of information, such as computer readable instructions, data structures, program modules, or other data. Storage 640 can include non-volatile storage media, such as solid state storage media, flash memory, or solid state storage system.

RAM 630 and storage 640 can each be implemented as a single storage device but can also be implemented across multiple storage devices or sub-systems. RAM 630 and storage 640 can each comprise additional elements, such as controllers, capable of communicating with processing system 601.

Software stored on or in RAM 630 or storage 640 can comprise computer program instructions, firmware, or some other form of machine-readable processing instructions having processes that when executed by processing system 601 direct content node 600 to operate as described herein. For example, software drives content node 600 to receive requests for content, determine if the content is stored in content node 600, retrieve content from origin servers, transfer content to end user devices, manage data storage systems for handling and storing the content, request portions of video or media content from origin servers, and transmux portions of video data, among other operations. The software can also include user software applications. The software can be implemented as a single application or as multiple applications. In general, the software can, when loaded into processing system 601 and executed, transform processing system 601 from a general-purpose device into a special-purpose device customized as described herein.

Figure 7:
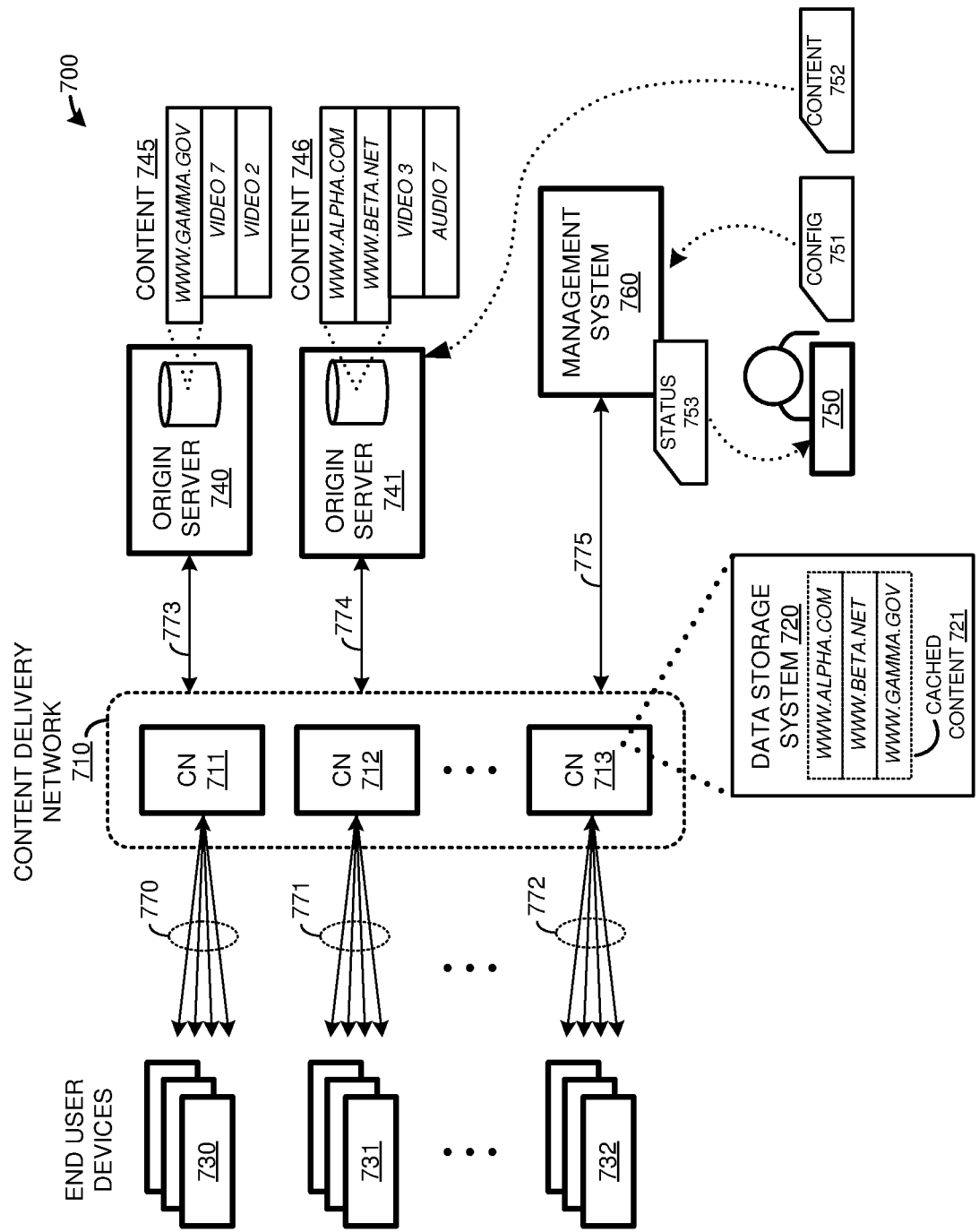
FIG. 7 is a system diagram illustrating a communication system.

As an example of a content delivery network that employs more than one content node, FIG. 7 is presented. FIG. 7 is a system diagram illustrating communication system 700. Communication system 700 includes content delivery network 710, end user devices 730-732, origin servers 740-741, and management system 760. Content delivery network 710 includes one or more content nodes (CN) 711-713. Each of CN 711-713 can include one or more data storage systems, such as data storage system 720 of CN 713. End user devices 730-732 are representative of a plurality of end user devices which can request and receive network content, and any number of end user devices 730-732 can be associated with each of content nodes 711-713. CN 711-713 and ones of end users 730-732 communicate over associated network links 770-772. Content delivery network 710 and origin servers 740-741 communicate over associated network links 773-774. Content delivery network 710 and management system 760 communicate over link 775. Although not shown in FIG. 7 for clarity, each of CN 711-713 can also communicate with each other over network links.

To further illustrate FIG. 7, a brief description of the operation of communication system 700 is included. In operation, end user devices 730-732 request network content, such as content 745-746 associated with origin servers 740-741. Instead of these requests being handled by the individual origin servers 740-741, individual content nodes 711-713 of content delivery network 710 receive the content requests over ones of links 770-772 and processes the content requests for delivery of the content to the associated end user devices 730-732. Requested network content that is already stored in ones of CN 711-713 can be provided quickly to the end user devices, while network content that is not already stored in ones of CN 711-713 can be responsively requested by an associated one of CN 711-713 from an appropriate origin server 740-741 for delivery by the CN and possible caching by the CN. In this manner, each of CN 711-713 can act as intermediary proxy nodes to provide local and fast access for end user devices 730-732 to network content of origin servers 740-741 without burdening origin servers 740-741. For example, CN 713 includes cached content 721, which can include portions of any of the content originated at origin servers 740-741.

Management system 760 handles configuration changes and status information collection and delivery for system operators and for the origin server operators or managers. For example, operator device 750 can transfer configuration 751 for delivery to management system 760, where configuration 751 can alter the handling of network content requests by CN 711-713, among other operations. Also, management system 760 can monitor status information for the operation of CN 711-713, such as operational statistics, and provide this status information as 753 to operator device 750. Furthermore, operator device 750 can transfer content 752 for delivery to origin servers 740-741 to include in content 745-746. Although one operator device 750 is shown in FIG. 7, it should be understood that this is merely representative and communication system 700 can include many operator devices for receiving status information, providing configuration information, or transferring content to origin servers.

CN 711-713, origin servers 740-741, and management system 760 can each include communication interfaces, network interfaces, processing systems, computer systems, microprocessors, storage systems, storage media, or some other processing devices or software systems, and can be distributed among multiple devices. Examples of CN 711-713, origin servers 740-741, and management system 760 can each include software such as an operating system, logs, databases, utilities, drivers, networking software, and other software stored on a computer-readable medium. Content delivery network 710, in addition to including CN 711-713, can include equipment and links to route communications between CN 711-713 and any of end user devices 730-732, origin servers 740-741, and management system 760, among other operations.

End user devices 730-732 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 770-775 each use metal, glass, optical, air, space, or some other material as the transport media. Communication links 770-775 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 770-775 can each be a direct link or can include intermediate networks, systems, or devices, and can include a logical network link transported over multiple physical links. Although one main link for each of links 770-775 is shown in FIG. 7, it should be understood that links 770-775 are merely illustrative to show communication modes or access pathways. In other examples, further links can be shown, with portions of the further links shared and used for different communication sessions or different content types, among other configurations. Communication links 770-775 can each include many different signals sharing the same associated link, as represented by the associated lines in FIG. 7, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method comprising:
providing a digital media caching environment using a cache node, including:
receiving a request from an end user device for a selected portion of digital media content in a first format;
responsive to the request from the end user, identifying an origin server acting as a persistent storage location for an original media file comprising the selected portion of digital media content;
retrieving a header corresponding to the original media file, the header comprising metadata for the original media file;
identifying an origin format of the original media file at least from the header;
processing the header to identify a byte range of the digital media content corresponding to the selected portion;
retrieving the selected portion from the origin server using the byte range;
responsive to the request from the end user, transmuxing the selected portion of the digital media content from the origin format into the first format and providing the selected portion to the end user device in the first format;
storing the selected portion in the first format to a cache memory of the cache node;
receiving a subsequent request for the selected portion in a second format;
transmuxing a copy of the selected portion from the cache memory from the first format to the second format and providing the content in the second format in response to the subsequent request; and
storing the selected portion in the second format to the cache memory.

2. The method of claim 1, further comprising:
issuing at least a first Hypertext Transfer Protocol (HTTP) range request to the origin server to retrieve the header portion and issuing at least a second HTTP range request for delivery to the origin server to retrieve the selected portion.

3. The method of claim 1, further comprising:
the first format is a stream format suitable for streaming to the end user device;
retrieving a second portion of the digital media content from the origin server;
transmuxing the second portion from the origin format into the first format; and
streaming the second portion in the stream format to the end user device.

4. The method of claim 1, further comprising:
caching the selected portion in the first format in a storage system of the cache node; and responsive to a second request from a second end user device for the digital media content, providing the selected portion in the first format to the second end user device.

5. The method of claim 1 further comprising:
sending the selected portion in the first format to the origin server for storage.

6. A cache node comprising:
a communication interface configured to exchange data over a network;
a nonvolatile storage medium;
a processing system configured to:
receive a request, via the communication interface, from an end user device for a selected portion of digital media content in a first format;
responsive to the request from the end user device, identify an origin server acting as a persistent storage location for an original media file comprising the selected portion of digital media content;
retrieve, via the communication interface, a header corresponding to the original media content, the header comprising metadata for the original media file;
identify an origin format of the original media file from the header;
process the header portion to identify a byte range of the digital media content corresponding to the selected portion;
retrieve the selected portion from the origin server using the byte range;
transmux the selected portion of the digital media content from the origin format into the first format;
providing the selected portion to the end user device in the first format via the communication interface;
store the selected portion in the first format to the nonvolatile storage medium;
receive a subsequent request, via the communication interface, for the selected portion in a second format;
transmux a copy of the selected portion from the nonvolatile storage medium from the first format to the second format;
provide the content in the second format in response to the subsequent request; and
store the selected portion in the second format to the nonvolatile storage medium.

7. The cache node of claim 6, further comprising:
the processing system configured to issue at least a first Hypertext Transfer Protocol (HTTP) range request to the origin server to retrieve the header portion and issue at least a second HTTP range request to the origin server to retrieve the selected portion.

8. The cache node of claim 6, further comprising:
the processing system configured to:
retrieve, via the communication interface, a second portion of the digital media content from the origin server;
transmux the second portion from the origin format into the first format; and
providing, via the communication interface, the second portion in the first format to the end user device.

9. The cache node of claim 6, comprising the processing system further configured to:
receive, via the communication interface, a second request from a second end user device for the selected portion of digital media content;
retrieve the selected portion in the first format from the nonvolatile storage medium; and provide the selected portion to the second end user device.

10. The cache node of claim 6, comprising the processing system further configured to send, via the communication interface, the selected portion in the first format to the origin server for storage.

11. The cache node of claim 6, further comprising:
the subsequent request is for a second portion of the digital media content that includes the selected portion and additional portions;
the processing system further configured to:
process the header to identify a second byte range of the digital media content corresponding to the additional portions;
retrieve the additional portions from the origin server using the second byte range;
transmux the additional portions from the origin format into the second format;
provide, via the communication interface, the additional portions in the second format in response to the subsequent request; and
cache the additional portions in the second format to the nonvolatile storage medium.

12. A data storage device storing instructions that, when executed, cause a processor to perform a method comprising:
operating a cache node of a content distribution network, including:
receiving a request from an end user device for a selected portion of digital media content in a first format;
responsive to the request from the end user, identifying an origin server acting as a persistent storage location for an original media file comprising the selected portion of digital media content;
retrieving a header corresponding to the original media file, the header comprising metadata for the original media file;
identifying an origin format of the original media file at least from the header;
processing the header portion to identify a byte range of the digital media content corresponding to the selected portion;
retrieving the selected portion from the origin server using the byte range;
responsive to the request from the end user device, transmuxing the selected portion of the digital media content from the origin format into the first format and providing the selected portion to the end user device in the first format;
storing the selected portion in the first format to a cache memory of the cache node;
receiving a subsequent request for the selected portion in a second format;
transmuxing a copy of the selected portion from the cache memory from the first format to the second format and providing the content in the second format in response to the subsequent request; and
storing the selected portion in the second format to the cache memory.

13. The data storage device of claim 12 storing instructions that, when executed, cause a processor to perform the method further including:
issuing at least a first Hypertext Transfer Protocol (HTTP) range request to the origin server to retrieve the header and issuing at least a second HTTP range request for delivery to the origin server to retrieve the selected portion.

14. The data storage device of claim 13 storing instructions that, when executed, cause a processor to perform the method:
wherein the first format is a stream format suitable for streaming to the end user device;
the method further including:
retrieving a second portion of the digital media content from the origin server;
transmuxing the second portion from the origin format into the stream format; and
streaming the second portion in the stream format to the end user device.

15. The data storage device of claim 14 storing instructions that, when executed, cause a processor to perform the method further including:
caching the selected portion in the first format in a storage system of the cache node; and
responsive to a second request from a second end user device for the digital media content, providing the selected portion in the first format to the second end user device.

16. The data storage device of claim 15 storing instructions that, when executed, cause a processor to perform the method further including:
sending the selected portion in the first format to the origin server for storage.

17. The data storage device of claim 15 storing instructions that, when executed, cause a processor to perform the method further including:
the subsequent request is for a second portion of the digital media content that includes the selected portion and additional portions;
processing the header to identify a second byte range of the digital media content corresponding to the additional portions;
retrieving the additional portions from the origin server using the second byte range;
transmuxing the additional portions from the origin format into the second format and providing the additional portions in the second format in response to the subsequent request; and
caching the additional portions in the second format.

* * * * *